United States Patent [19]

Ouchi et al.

[11] Patent Number: 5,329,104

[45] Date of Patent: Jul. 12, 1994

[54] AUTOMATICALLY IDENTIFYING DECODE APPARATUS

[75] Inventors: Junichi Ouchi; Kazuo Hasegawa, both of Furukawa, Japan

[73] Assignee: Alps Electric Co., Ltd., Tokyo, Japan

[21] Appl. No.: 26,334

[22] Filed: Mar. 4, 1993

[30] Foreign Application Priority Data

Mar. 10, 1992 [JP] Japan ................................. 4-051759

[51] Int. Cl.$^5$ ............................................. G06K 7/10
[52] U.S. Cl. .................................. 235/462; 235/472; 235/436; 235/466
[58] Field of Search ............... 235/462, 472, 436, 463, 235/466, 467; 250/568, 208.6

[56] References Cited

U.S. PATENT DOCUMENTS

| | | | |
|---|---|---|---|
| 4,728,784 | 3/1988 | Stewart | 235/466 |
| 4,743,744 | 5/1988 | Nakase et al. | 235/472 X |
| 4,782,220 | 11/1988 | Shuren | 234/463 |
| 4,855,581 | 8/1989 | Mertel et al. | 235/462 |
| 5,124,537 | 6/1992 | Chandler et al. | 235/462 |
| 5,144,118 | 9/1992 | Actis et al. | 235/462 |

FOREIGN PATENT DOCUMENTS 3821663  1/1990  Fed. Rep. of Germany ...... 235/467

Primary Examiner—Donald Hajec
Assistant Examiner—Esther Chin
Attorney, Agent, or Firm—Guy W. Shoup; Patrick T. Bever

[57] ABSTRACT

The present invention provides an automatically identifying decode apparatus comprising a decoder unit 1 and a counter 2, wherein:

the decoder unit 1 further comprises a plurality of decoders for decoding digital data of different digital-data types and a decoder selector for sequentially selecting the decoders;

the counter 2 is used for sequentially advancing a process of selecting the decoders of the decoder unit;

digital data read out from memory is supplied directly to the decoders of the decoder unit;

one of the decoders successfully decoding the digital data outputs decoded data; and a selected decoder failing to decode the digital data transmits an error signal to the counter 2, requesting the counter 2 to advance the process of selecting the decoders by one decoder.

2 Claims, 8 Drawing Sheets

AUTOMATICALLY IDENTIFYING DECODE APPARATUS

BACKGROUND OF THE INVENTION

1. Field of the Invention

The present invention relates to an automatically identifying decode apparatus for automatically identifying and decoding digital data of various types pertaining to a plurality of different systems. In particular, the present invention relates to an automatically identifying decode apparatus for enhancing the speed of a process of decoding digital data.

2. Description of the Related Art

So far, an information processing system for handling mixed data having a variety of types pertaining to a plurality of different systems has been proposed. Examples of bar-code systems for handling bar codes as digital data include JAN, C39, NW7 and ITF. There are a plurality of bar-code systems which are different from each other depending upon the application fields of the bar codes. In such systems, an automatically identifying decode apparatus, which can identify the type of digital data automatically and decode the digital data of whatever type, is employed.

A typical automatically identifying decode apparatus employed in an information processing system for handling such kinds of bar codes is disclosed in the U.S. Pat. No. 4,743,744. An overview of the automatically identifying decode apparatus is described as follows.

The automatically identifying decode apparatus employes a bar-code scanner having a bar-code reader for reading a bar code. A signal generated by the bar-code reader is converted into a binary-code signal which conveys count values each representing the width of a bar of the bar code. The count values are added up to give a total which is stored into a count-value memory unit 71. That is to say, as the operation to read the bar code is completed, a total count value N representing a total width of all bars is stored into the count-value memory unit 71. A read start signal SR is supplied to a read start signal input terminal 79 to read the count values N from the count-value memory unit 71 one after another in the same order they were stored in the memory unit 71. Data read from the count-value memory unit 71 is supplied to bar-code decoders 72, 73 and 74.

The bar-code decoder 72, a bar-code decoder for the JAN system, is requested by the read start signal SR to decode the count value N. Assume that the count value N representing a JAN bar code is decoded by the bar-code decoder 72 successfully into decoded data DD. In this case, a decode completion signal E1 is output at the end of the decoding to indicate a successful operation.

A count value N not representing a JAN bar code, on the other hand, cannot be decoded by the bar-code decoder 72 which is dedicated only for the JAN system. In this case, a decode failure signal F1 is output along with the decode completion signal E1. Both the signals E1 and F1 are supplied to an AND gate 75 to produce an error signal ER1 which is fed to the count-value memory unit 71 as an activation signal through an OR gate 78, and to the bar-code decoder 73 for the ITF system.

The activation signal activates an operation for reading the count value N from the count-value memory unit 71 again. This time, however, the count value N is decoded by the bar-code decoder 73 for the ITF system. Much like the bar-code decoder 72, decoded data DD and a decode completion signal E2 are output for a successful operation. If decoding cannot be performed, however, the decode completion signal E2 and a decode failure signal F2 are both supplied to an AND gate 76 to generate an error signal ER2. The error signal ER2 is fed to the count-value memory unit 71 as an activation signal through an OR gate 78, and to the bar-code decoder 74 for the NW7 system. Likewise, the bar-code decoder 74 makes an attempt to decode the count value N again.

As described above, the automatically identifying decode apparatus for decoding a bar code once stores a count value N representing the widths of bars of a bar code into a count-value memory unit 71. The stored count value N is then supplied to the bar-code decoders 72, 73 and 74 in turn, to one bar-code decoder at a time, for decoding. Thus, at least, while a count value N is being written into the count-value memory unit 71, no decoding operation can be performed. In other words, a decoding operation cannot be started until the operation to write a count value N into the count-value memory unit 71 is completed. As a result, it takes a long time to complete the decoding of a count value N read from a bar code.

In addition, it is necessary to store all count values resulting from an operation to read bar-code data in the count-value memory unit 71. Therefore, a RAM (Random-Access Memory) unit with a large capacity is used as the count-value memory unit 71, giving rise to a problem that the cost and size of the automatically identifying decode apparatus for reading bar codes are inevitably high and large respectively.

Addressing this problem, the present invention provides an automatically identifying decode apparatus that has a short time from reading to decoding a bar code and requires no large amount of RAM.

SUMMARY OF THE INVENTION

The automatically identifying decode apparatus provided by the present invention comprises a decoder unit and a counter. The decoder unit further comprises a plurality of decoders each for decoding digital data of a certain type among a plurality of different digital-data types, and a decoder selector for sequentially selecting one of the decoders. The counter is used for sequentially advancing the process of selecting the decoders. The automatically identifying decode apparatus allows digital data read out from memory to be supplied directly to the decoders of the decoder unit. One of the decoders successfully decoding the digital data, if any, outputs decoded data. A selected decoder, which fails to decode the digital data, transmits an error signal to the counter, requesting the counter to carry forward the selection of the decoders by one decoder. Then, a next decoder is selected and the operation is thereby repeated.

In addition, the automatically identifying decode apparatus also comprises a decode order setting-modifying means and/or a decode selection order switching means located between the decoder unit and the counter. The decode order setting-modifying means is used to change the decode selection order according to which the decoders employed in the decoder unit are to be selected. The decode selection order switching means is used for selecting either a value presently output by the counter or a value which was previously output by the counter when the decoding was then successful. The automatically identifying decode apparatus further comprises a decoded-data comparing means located on the output side of the decoder unit for comparing decoded data presently output by the decoder unit to decoded data which was previously output by the decoder unit when the decoding was then successful. A decoder, that decoded digital data successfully in the immediately previous decoding operation or in a previous decoding operation, is reselected as a first decoder in the next operation to decode digital data again.

DESCRIPTION OF THE PREFERRED EMBODIMENTS

The present invention will become apparent from the following detailed description of preferred embodiments with reference to the accompanying diagrams described above.

Figure 1:
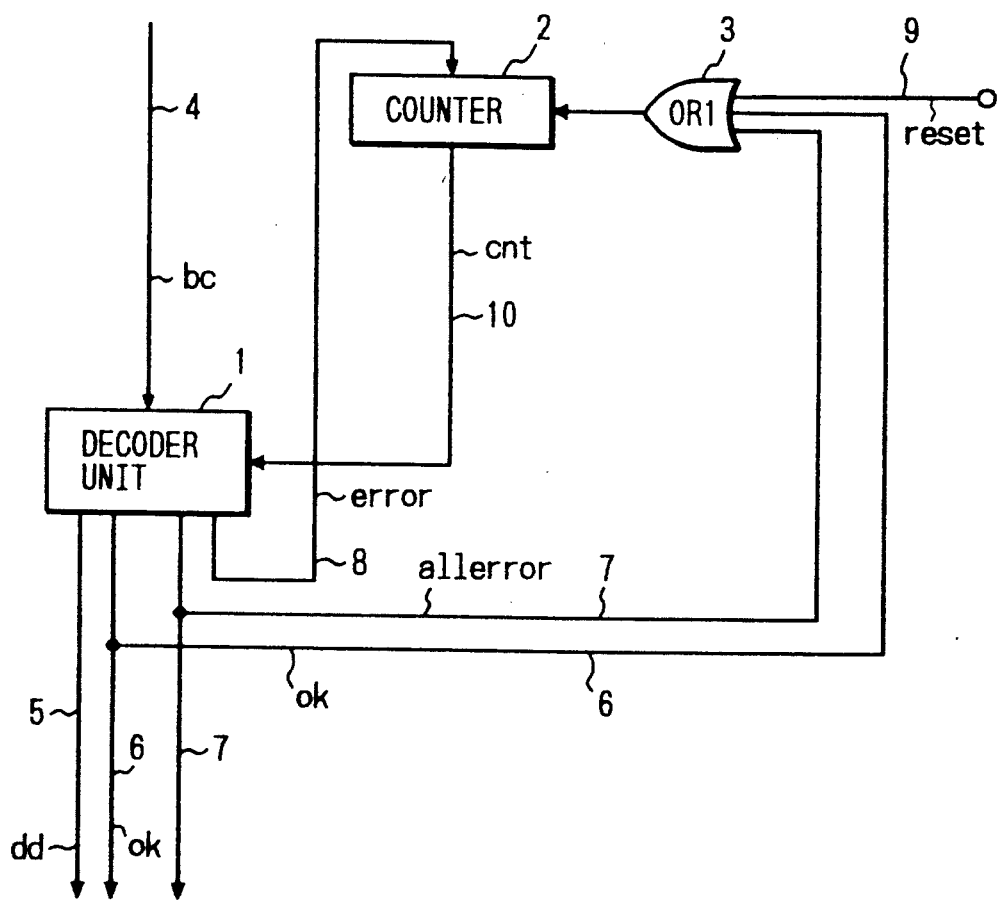
FIG. 1 is a circuit block diagram showing a configuration of a first embodiment implementing an automatically identifying decode apparatus in accordance with the present invention.

FIG. 1 is a circuit block diagram showing a configuration of a first embodiment implementing an automatically identifying decode apparatus in accordance with the present invention.

As shown in the figure, the input of a decoder unit 1 is connected to a bar-code data input line 4 whereas the output thereof is connected to a decoded data output line 5. A counter 2 is connected to the decoder unit 1 through an error-signal output line 8 and a count-signal output line 10. The counter 2 is also connected to the output of an OR gate 3 as well. A decode-success signal output line 6, an all-error signal output line 7 and a reset signal input line 9 are connected as input lines to the OR gate 3.

Figure 2:
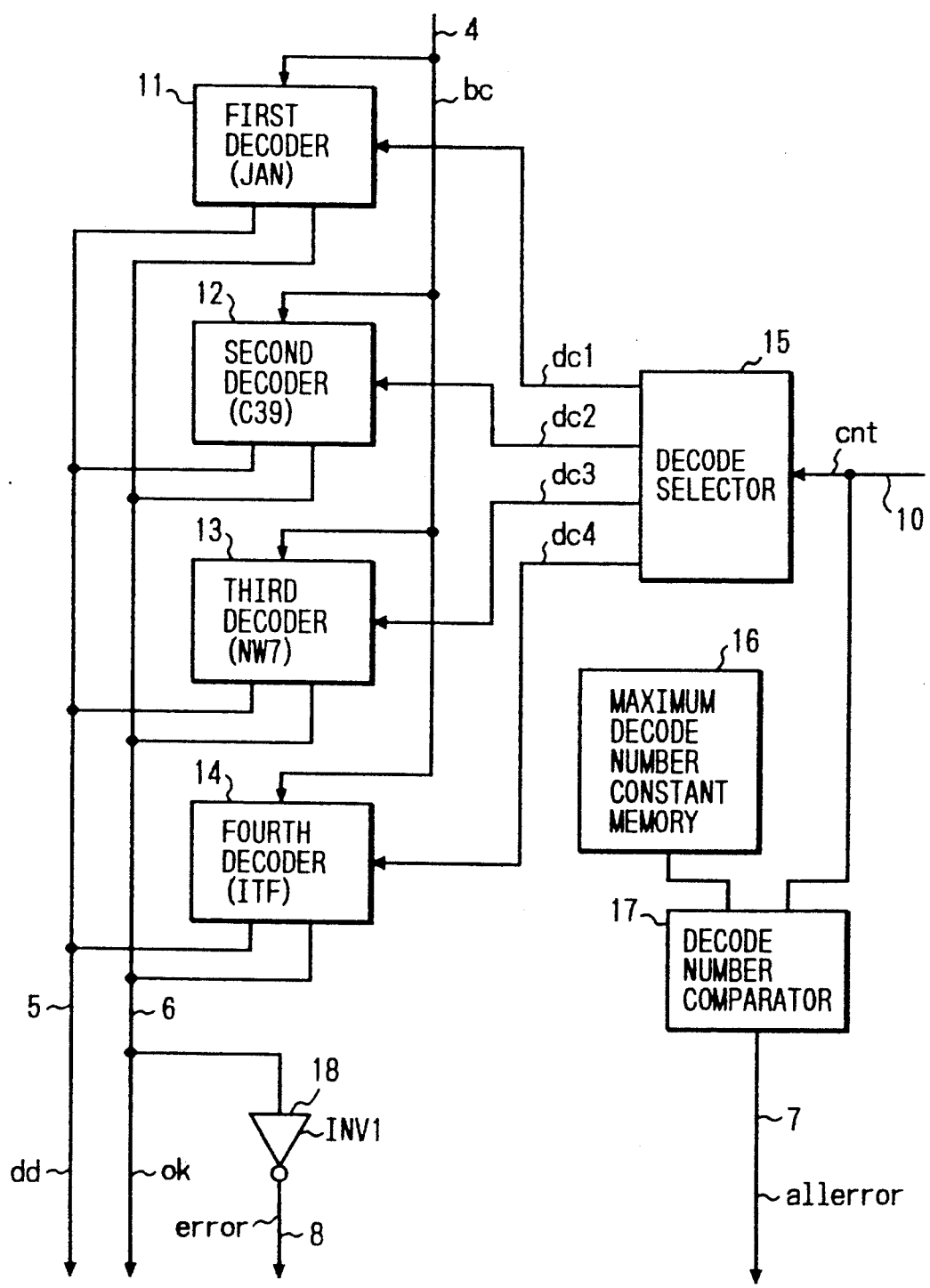
FIG. 2 is a circuit block diagram showing a typical configuration of a decoder unit employed in the first embodiment shown in FIG. 1.

FIG. 2 is a circuit block diagram showing a typical internal configuration of the decoder unit 1 employed in the first embodiment shown in FIG. 1. As shown in the figure, the decoder unit 1 comprises a bar-code decoder 11 for the JAN system, a bar-code decoder 12 for the C39 system, a bar-code decoder 13 for the NW7 system, a bar-code decoder 14 for the ITF system, a decode selector 15, a maximum decode number constant memory unit 16, a decode number comparator 17 and an inverter 18.

The input and output of each of the bar-code decoders 11 to 14 are connected to the bar-code data input line 4 and the decoded-data output line 5 respectively. The outputs of the decode selector 15 are connected to operation enable pins of the bar-code decoders 11 to 14. The input of the decode selector 15 is connected to the count-signal output line 10. The decode-success signal output line 6 is connected to the bar-code decoders 11 to 14 directly whereas the error-signal output line 8 is connected to the bar-code decoders 11 to 14 through the inverter 18. The inputs of the decode number comparator 17 are connected to the maximum decode number constant memory unit 16 and the count-signal output line 10 while the output thereof is tied to the all-error signal output line 7.

The principle of operation of the first embodiment with a configuration described above is explained as follows.

A bar-code reader, not shown in the figure, reads a bar code, creating a binary signal having binary values to represent the black and white levels of the bar code. The binary signal is supplied to a timer circuit, also not shown in the figure, to be added to bar-code data bc and converted into a count value which numerically represents the widths of bars of the bar code. The bar-code data bc or the count value is supplied directly to the bar-code decoders 11 to 14 of the decoder unit 1 through the bar-code data input line 4.

At that time, only one of operation selecting signals dc1 to dc4 is asserted by the decode selector 15 so that only one of the bar-code decoders 11 to 14 is enabled to decode the bar-code data bc. The selection of the operation selecting signal dc1, dc2, dc3 or dc4 for assertion is based on the value of a count signal supplied to the decode selector 15 through the count-signal output line 10. At an initial state of the automatically identifying decode apparatus, the selection is started with the operation selecting signal dc1 which typically corresponds to a count-signal value of 1. The selection continues to the operation selecting signal dc2 corresponding to a value of 2, then to the signal dc3 corresponding to a value of 3 and finally to the signal dc4 corresponding to a value of 4, a maximum count-signal value in this configuration.

Now, assume that bar-code data bc is supplied through the bar-code data line 4 at the initial state of the automatically identifying decode apparatus. Initially, the bar-code decoder 11 for the JAN system is selected and put in a decode-operation enabled state. The bar-code data bc is decoded by the bar-code decoder 11. In this case, if the bar-code data bc is of the JAN-system type, the bar-code decoder 11 decodes it successfully, outputting decoded data dd through the decoded data output line 5. At the same time, a decode success signal or an OK signal is asserted on the decode success signal output line 6. The OK signal is then supplied to the counter 2 through the OR gate 3. The counter 2 is thereby reset, clearing its contents to zero. The automatically identifying decode apparatus therefore returns back to an initial state.

However, the bar-code decoder 11 cannot decode bar-code data bc if it is other than that of the JAN-system type. In this case, the OK signal is not asserted on the decode success output line 6, causing the inverter 18 to transmit an error signal through the error-signal output line 8 to the counter 2. Receiving the error signal, the counter 2 increments its contents by unity. Accordingly, the value of the count signal appearing on the count-signal output line 10 is also incremented by 1 as well to a value of 2. The incremented count signal is supplied to the decode selector 15 which thereby asserts the operation selecting signal dc2 to select the bar-code decoder 12 in place of the operation selecting signal dct which has been active so far. Thereafter, the bar-code decoder 12 for the C39 system enters an operative state.

At that time, the bar-code data bc supplied through the bar-code input line 4 is decoded by the bar-code decoder 12 for the C39 system which has been selectively put this time into a decode-operation enabled state by the operation selecting signal dc2. Much like the JAN system described above, if the bar-code data bc is of the C39-system type, the bar-code decoder 12 decodes it successfully, outputting decoded data dd through the decoded data output line 5. At the same time, a decode success signal or an OK signal is asserted on the decode success signal output line 6. The OK signal is then supplied to the counter 2 through the OR gate 3. The counter 2 is thereby reset, clearing its contents to zero.

However, the bar-code decoder 11 cannot decode bar-code data bc if it is other than that of the C39-system type. In this case, the OK signal is not asserted on the decode success output line 6, causing the inverter 18 to transmit an error signal through the error-signal output line 8 to the counter 2. Receiving the error signal, the counter 2 increments its contents by unity. Accordingly, the value of the count signal appearing on the count-signal output line 10 is also incremented further by 1 as well to a value of 3. The incremented count signal is supplied to the decode selector 15 which thereby asserts the operation selecting signal dc3 to select the bar-code decoder 13 in place of the operation selecting signal dc2 which has been active so far. Thereafter, the bar-code decoder 13 for the NW7 system enters an operative state.

Operations thereafter are carried out in the same way. That is to say, if the bar-code data bc is of the NW7-system type, the bar-code decoder 13 decodes it successfully, outputting decoded data dd through the decoded data output line 5. Otherwise, the bar-code decoder 13 ends in a failure in an attempt to decode the bar-code data bc. Likewise, the bar-code decoder 14 for the ITF system then makes a similar attempt to decode the bar code bc.

If all the bar-code decoders 11 to 14 end in a failure in an attempt to decode the bar code bc, the count signal output line 10 conveys a count signal with a value of 4 in this case which matches an output signal from the maximum decode number constant memory unit 16 also having a value of 4. The decode number comparator 17 thereby asserts a match signal on the all-error signal output line 7 as an all-error signal which is supplied to the counter 2 through the OR gate 3. Receiving the all-error signal, the contents of the counter 2 are cleared to zero. Accordingly, the automatically identifying decode apparatus returns back to the initial state, repeating the operations described above.

In this embodiment, bar-code data bc read from a bar code is supplied to the bar-code decoder 11 to 14 without the necessity to once store the data into a count-value memory unit as is described above. The bar-code decoders 11 to 14 are requested one after another to decode the bar-code data bc directly, saving the automatically identifying decode apparatus the time to write the data into a count-value memory unit. Accordingly, the time from the start of the operation to read a bar code to the completion of its decoding is shortened. Moreover, no count-value memory unit is required, and the capacity of the RAM in use can thus be made smaller to adequately perform the functions.

Figure 3:
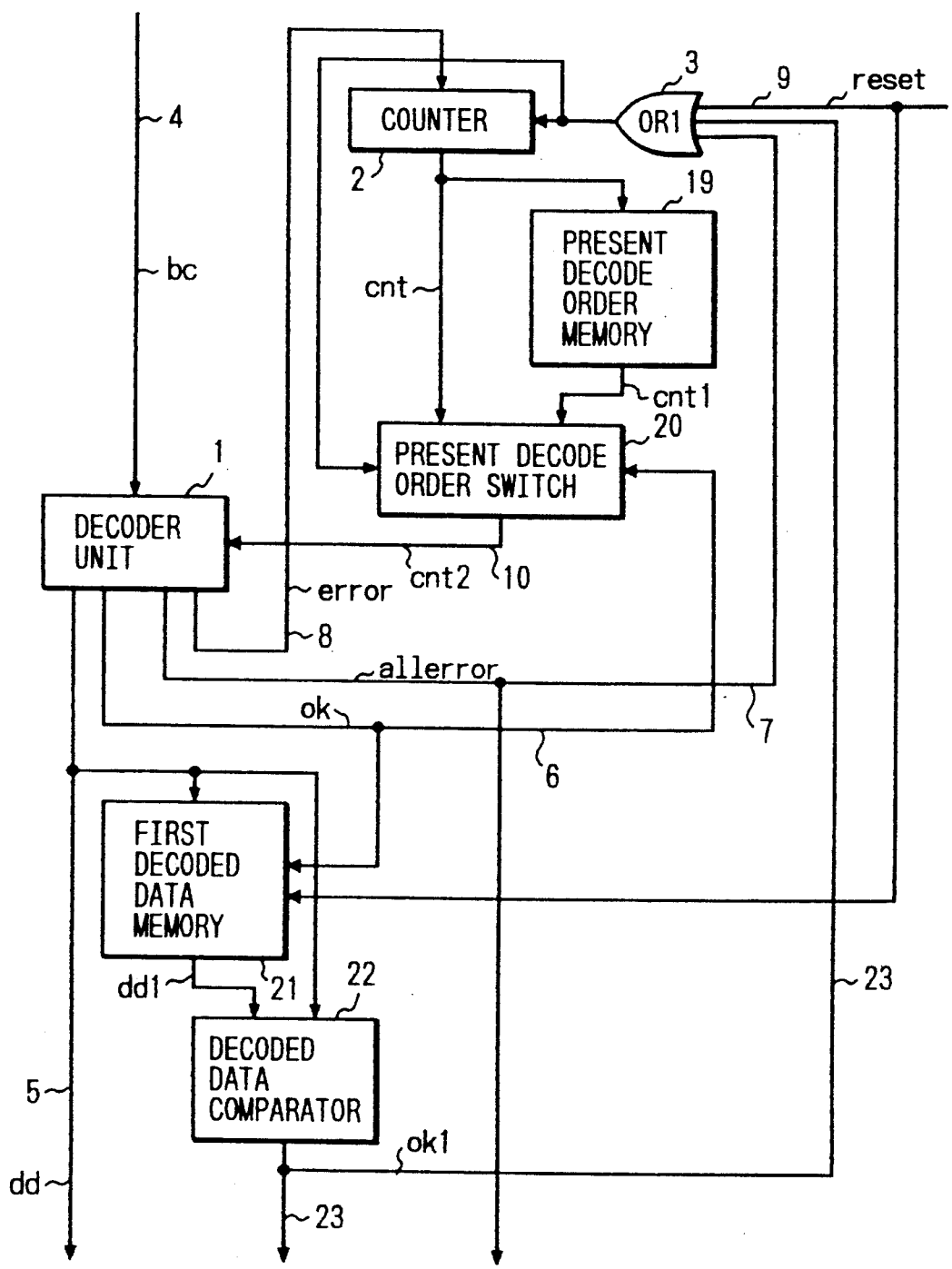
FIG. 3 is a circuit block diagram showing a configuration of a second embodiment implementing an automatically identifying decode apparatus in accordance with the present invention.

FIG. 3 is a circuit block diagram showing a configuration of a second embodiment implementing an automatically identifying decode apparatus in accordance with the present invention.

Reference numeral 19 shown in the figure denotes a present decode order memory unit whereas reference numeral 20 is a present decode order switch. Reference numerals 21 and 22 denote a first decoded data memory unit and a decoded data comparator respectively. Reference numeral 23 is a second decode success signal output line. Other components in the configuration which have identical functions with those shown in FIGS. 1 and 2 are assigned the same reference numerals.

The input and output of the present decode order memory unit 19 are connected to the counter 2 and the present decode order switch 20 respectively. Connected to inputs of the present decode order switch 20 are the counter 2, the output of the OR gate 3, the output of the present decode order memory unit 19 and the decode success signal output line 6. The output of the present decode order switch 20 is connected to the count signal output line 10. As for the first decoded data memory unit 21, the input thereof is connected to a decoder unit 1 whereas its output is tied to one of inputs of the decoded data comparator 22. The other input of the decoded data comparator 22 is connected to the decoder unit 1 and the output thereof is connected to the second decode success signal output line 23 which is tied to an input of the OR gate 3. In this configuration, the present decode order memory unit 19 and the present decode order switch 20 form a decode select order switching means. The first decoded data memory unit 21, on the other hand, constitutes a decoded data comparing means in conjunction with the decoded data comparator 22. It should be noted that the decoder unit 1 of the embodiment has the same configuration as that employed in the first embodiment.

In this case, the present decode order memory unit 19 stores a count value cnt, the present contents of the counter 2, and then generates a first count value cnt1 corresponding to the data stored therein. Receiving a reset signal from the OR gate 3, the present decode order switch 20 outputs the count value cnt as a second count value cnt2. When a decode success signal is received from the decoder unit 1, however, the present decode order switch 20 forwards the first count value cnt1 as it is. Receiving the decode success signal, the first decoded data memory unit 21 stores decoded data dd output by the decoder unit 1. The decoded data dd stored in the first decoded data memory unit 21 is output as second decoded data dd1 and cleared when a reset signal is supplied to the first decoded data memory unit 21. If the decoded data dd matches the second decoded data dd1, the decoded data comparator 22 outputs a second decode success signal OK1.

The principle of operation of the second embodiment with a configuration described above is explained as follows.

First of all, a bar-code reader, not shown in the figure, reads a bar code, creating a binary signal having binary values to represent the black and white levels of the bar code. The binary signal is then supplied to a timer circuit, also not shown in the figure, to be added to bar-code data bc and converted into a count value which numerically represents the widths of bars of the bar code. The bar-code data bc is supplied directly to the bar-code decoders 11 to 14 of the decoder unit 1 through the bar-code data input line 4. The operations up to this point are the same as those of the first embodiment.

In addition, with the present decode order switch 20 positioned to output the count value cnt from the counter 2 as the second count value cnt2, the operations of the circuits including the decoder unit 1, the counter 2 and the OR gate 3 are also the same as those of the first embodiment.

The following is description of operations peculiar to this embodiment. If one of the decoders employed in the decoder unit 1, e.g., the bar-code decoder 12 for the C39 system, decodes bar-code data bc successfully, decoded data dd is output through the decoded data output line 5. At the same time, a decode success signal or an OK signal is asserted on the decode success signal output line 6. The decoded data dd is supplied to the first decoded data memory unit 21 to be stored therein whereas the OK signal is fed to the present decode order switch 20 through the decode success signal output line 6. Receiving the OK signal, the present decode order switch 20 is switched to forward the first count value cnt1 stored in the present decode order memory unit 19 as it is, replacing the count value cnt from the counter 2 which has been output so far as the second count value cnt2. It should be noted that the first count value cnt1 output by the present decode order memory unit 19 at the switching time of the present decode order switch 20 also causes an operation selecting signal dc2 for selecting the successful bar-code decoder 12 to be generated. Accordingly, when the decoder unit 1 decodes the bar-code data bc next time, the bar-code selector 12 for the C39 system is selected again.

Subsequently, the bar-code data bc is supplied to the decoder unit 1. If the bar-code data bc is of the C39-system type, the bar-code decoder 12 decodes it successfully, outputting decoded data dd through the decoded data output line 5. At that time, the decoded data comparator 22 compares the decoded data dd to the decoded data dd stored in the first decoded data memory unit 21. If both the pieces of decoded data dd match each other, the decoded data comparator 22 outputs a second decode success signal (second OK signal) OK1 to indicate that the bar-code data bc has also been this time decoded successfully. The second OK signal OK1 is supplied to the counter 2 through the OR gate 3. The counter 2 is thereby reset, clearing its contents to zero. The automatically identifying decode apparatus therefore returns to an initial state.

It should be noted that, in this embodiment, if one of the decoders employed in the decoder unit 1, e.g., the bar-code decoder 12 for the C39 system, fails to decode the bar-code data bc after it has decoded the bar-code data bc successfully, the present decode order switch 20 is switched to output the count value cnt from the counter 2 as the second count value cnt2. Operations carried out thereafter are the same as those of the first embodiment.

A case study has been given above for this embodiment. In this case, one of the decoders employed in the decoder unit 1, i.e. the bar-code decoder 12 for the C39 system, decodes bar-code data bc successfully. It should be noted that the description given above applies not only to the bar-code decoder 12 for the C39 system, but also to the other bar-code decoders 11, 13 and 14 as well. That is to say, also in the case of the bar-code decoder 11 for the JAN system, the bar-code decoder 13 for the NW7 system or the bar-code decoder 14 for the ITF system, an operation exactly identical with that for the bar-code decoder 12 for the C39 system is performed whenever the bar-code data bc is decoded successfully.

Generally speaking, when bar-code data of a certain system is supplied, it is very likely that the succeeding bar-code data of the same type as the preceding one follows. As a matter of fact, this embodiment is configured with this phenomenon taken into consideration.

To be more specific, in the case of this embodiment, when a bar-code decoder decodes bar-code data bc successfully, the very same bar-code decoder is selected again for decoding the following bar-code data bc. In addition, by comparison of the current decoded data to the previous decoded data, it can be found out whether or not the current decoding has been done successfully. In this way, the adopted decoding technique can save the automatically identifying decode apparatus the time required for storing bar-code data into a count-value memory unit. The time from an operation to start reading bar-code data to the completion of an operation to decode it can thus be shortened further. In addition to the benefit reaped from the fact that a small amount of required RAM is sufficient due to the elimination of the no-longer-used count-value memory unit as is explained in the description of the first embodiment, an effect of reliability enhancement of decoded data is also resulted in as well.

Figure 4:
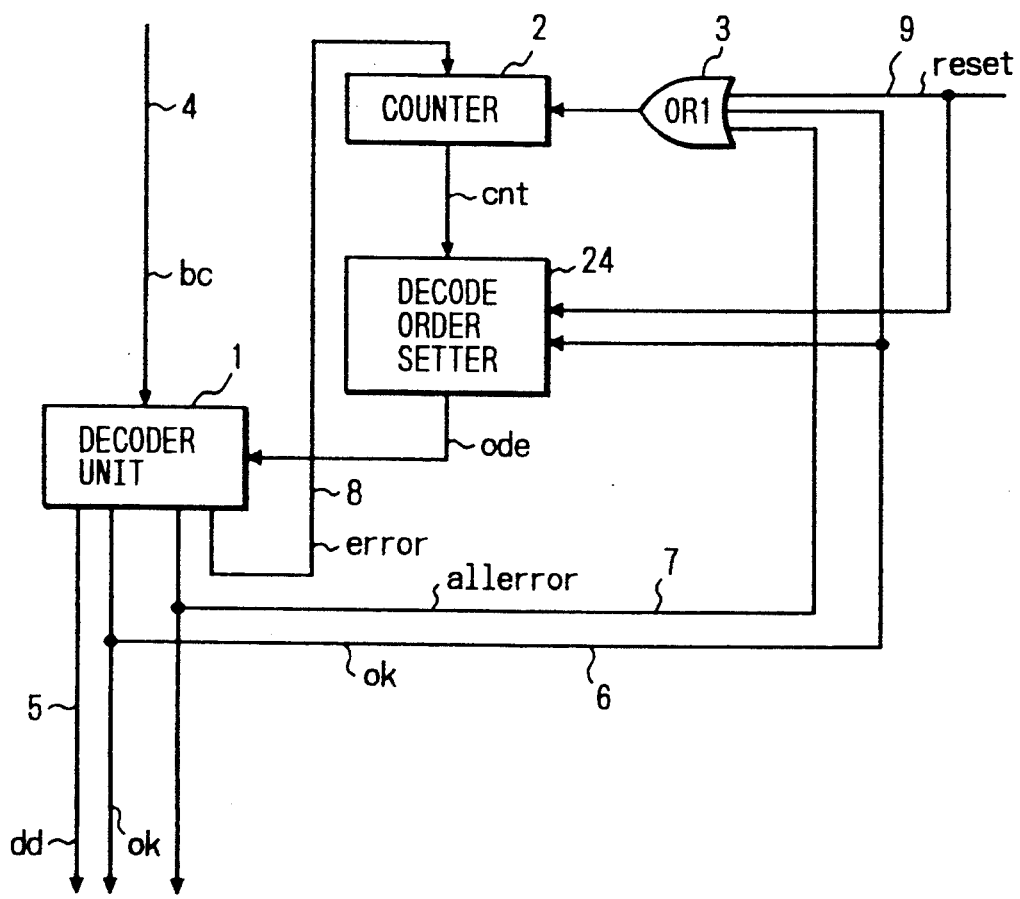
FIG. 4 is a circuit block diagram showing a configuration of a third embodiment implementing an automatically identifying decode apparatus in accordance with the present invention.

FIG. 4 is a circuit block diagram showing a configuration of a third embodiment implementing an automatically identifying decode apparatus in accordance with the present invention.

Reference numeral 24 shown in the figure is a decode order setter. Other components which have identical functions as those shown in FIGS. 1 and 2 are assigned the same reference numerals.

As shown in the figure, the input and output of the decode order setter 24 are connected to the counter 2 and the decoder unit 1 respectively. In addition, the decode success signal output line 6 and the reset signal input line 9 are also connected to the decode order setter 24. It should be noted that the decoder unit 1 employed in this embodiment also has the same configuration as that of the first embodiment.

Receiving a count value cnt from the counter 2 and an OK signal from the decoder unit 1, the decode order setter 24 changes the contents of decode order memory units to be described below.

Figure 5:
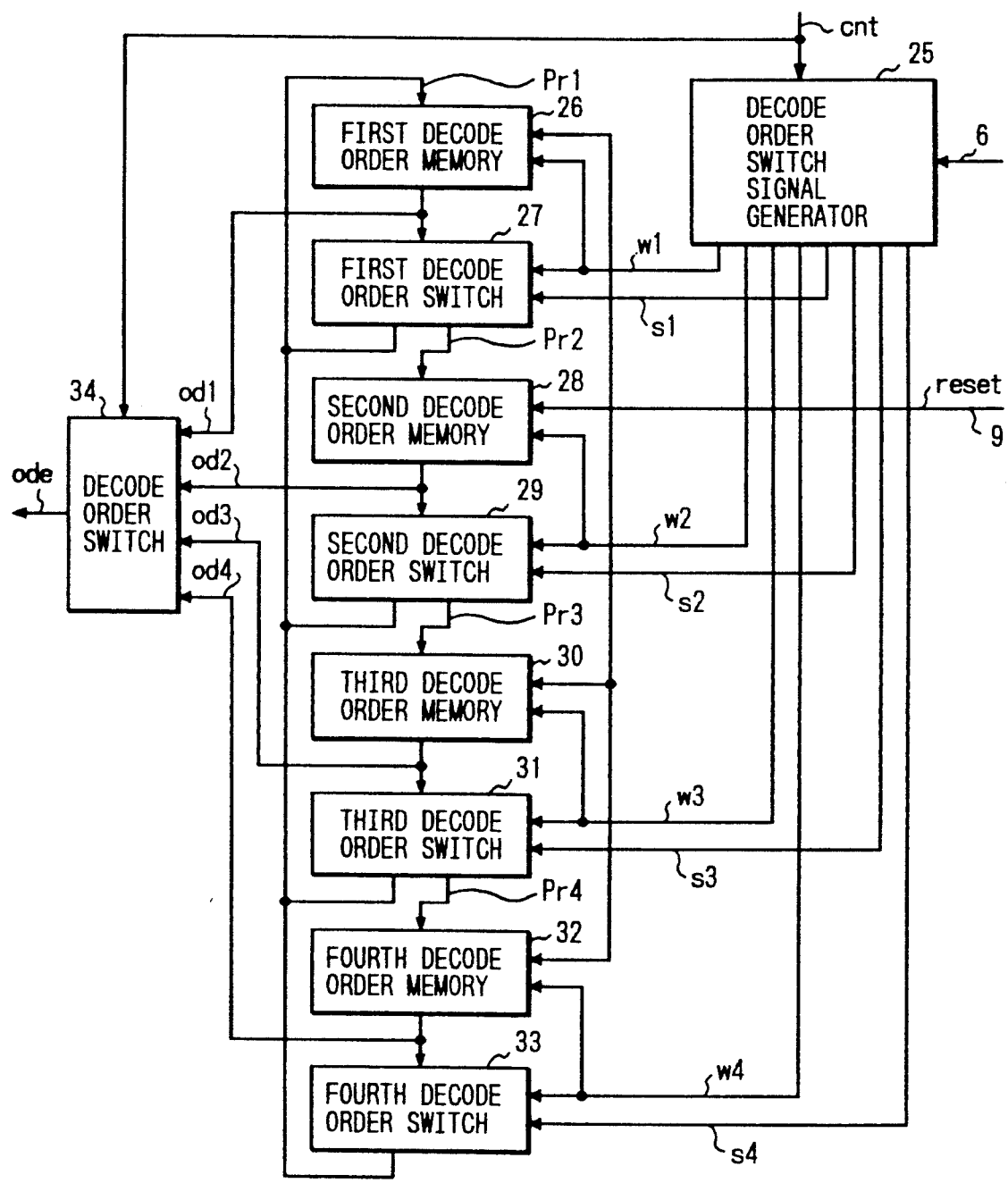
FIG. 5 is a circuit block diagram showing a typical configuration of a decode order setter employed in the third embodiment shown in FIG. 4.

FIG. 5 is a circuit block diagram showing a typical configuration of the decode-order setter 24 employed in the third embodiment shown in FIG. 4.

Reference numeral 25 shown in the figure is a decode order switch signal generator. Reference numerals 26 and 27 denote a first decode order memory unit and a first decode order switch respectively. Reference numerals 28 and 29 denote a second decode order memory unit and a second decode order switch respectively. Reference numerals 30 and 31 denote a third decode order memory unit and a third decode order switch respectively. Reference numerals 32 and 33 denote a fourth decode order memory unit and a fourth decode order switch respectively.

As shown in the figure, the decode order switch signal generator 25 has a single input and eight outputs. The input is connected to the output of the counter 2 whereas the eight outputs are connected to the decode order memory units 26, 28, 30 and 32 and the decode order switches 27, 29, 31 and 33 respectively. The decode success signal output line 6 is also connected to the decode order switch signal generator 25. The decode order memory units 26, 28, 30 and 32 and the decode order switches 27, 29, 31 and 33 are laid out alternately and connected to each other by first, second, third and fourth preset signal lines Pr1 to Pr4 to form a closed loop. A decode order switch 34 has a single output and four inputs. The four inputs are connected to the outputs of the decode order memory units 26, 28, 30 and 32 respectively. The output is tied to the decoder unit 1. It should be noted that the decoder unit 1 employed in this embodiment also has the same configuration as that of the first embodiment.

Assertion of a first write signal w1 causes the first decode order memory unit 26 to store the first preset signal Pr1. The contents stored therein are output as a first order signal od1. A reset signal asserted on a reset signal input line 9 resets the first decode order memory unit 26 to a predetermined initial state. The assertion of the first write signal w1 also causes the first decode order switch 27 to forward the first order signal od1 to the following second decode order memory unit 28 as the second preset signal Pr2. Simultaneous assertion of the first write signal w1 and a first set signal s1 causes the first decode order switch 27 to forward the first order signal od1 to the first decode order memory unit 26 as the first preset signal Pr1.

Assertion of a second write signal w2 causes the second decode order memory unit 28 to store the second preset signal Pr2. The contents stored therein are output as a second order signal od2. The reset signal asserted on the reset signal input line 9 resets the second decode order memory unit 86 to a predetermined initial state. The assertion of the second write signal w2 also causes the second decode order switch 29 to forward the second order signal od2 to the following third decode order memory unit 30 as the third preset signal Pr3. Likewise, simultaneous assertion of the second write signal w2 and a second set signal s2 causes the second decode order switch 29 to forward the second order signal od2 to the first decode order memory unit 26 as the first preset signal Pr1. The functions of the following third and fourth decode order memory units 30 and 32 and the following third and fourth decode order switches 31 and 33 are similar to those of the first and second decode order memory units 26 and 28 and the first and second decode order switches 27 and 29. The decode order switch 34 selects and forwards one of the first, second, third and fourth order signals od1 to od4 depending upon the value of the count signal cnt received from the counter 2.

Figure 6:
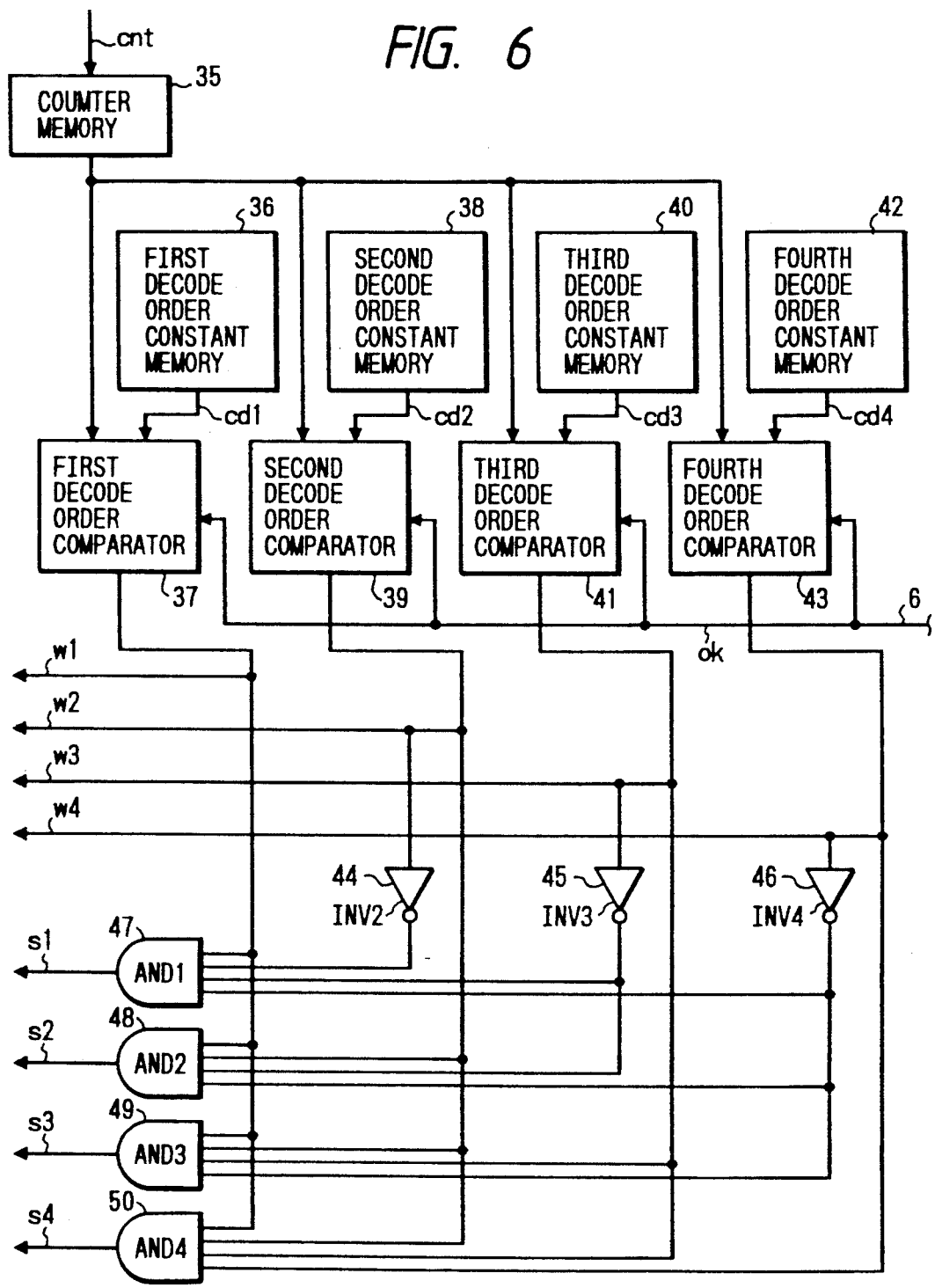
FIG. 6 is a circuit block diagram showing a typical configuration of a decode order switch signal generator employed in the decode order setter shown in FIG. 5.

FIG. 6 is a circuit block diagram showing a typical configuration of the decode order switch signal generator 25 employed in the decode order setter shown in FIG. 5.

Reference numeral 35 shown in the figure is a counter memory unit. Reference numerals 36 and 37 denote a first decode order constant memory unit and a first decode order comparator respectively. Reference numerals 38 and 39 denote a second decode order constant memory unit and a second decode order comparator respectively. Reference numerals 40 and 41 denote a third decode order constant memory unit and a third decode order comparator respectively. Reference numerals 42 and 43 denote a fourth decode order constant memory unit and a fourth decode order comparator respectively.

The output of the counter memory unit 35 is connected to inputs of the first, second, third and fourth decode order comparators 37, 39, 41 and 43 respectively. The other inputs of the first, second, third and fourth decode order comparators 37, 39, 41 and 43 are connected to the outputs of the corresponding first, second, third and fourth decode order constant memory units 36, 38, 40 and 42. The outputs of the first, second, third and fourth decode order comparators 37, 39, 41 and 43 are connected to the inputs of the AND gates 47, 48, 49 and 50 directly or indirectly through the inverters 44, 45 and 46.

The counter memory unit 35 is used for storing a count value cnt output by the counter 2. The count value cnt stored therein is output as a count value cntc. The first decode order constant memory unit 36 outputs a first constant cd1 having a value of, for example, unity which is predetermined in advance. Receiving the OK signal through the decode success signal output line 6, the first decode order comparator 37 compares the count value cntc to the first constant cd1. If the former cntc is found to be larger than or equal to the latter cd1, the first decode order comparator 37 asserts the first write signal w1. The second decode order constant memory unit 38 outputs a second constant cd2 having a value of, for example, 2 which is also predetermined in advance. Receiving the OK signal through the decode success signal output line 6, the second decode order comparator 39 compares the count value cntc to the second constant cd2. If the former cntc is found to be larger than or equal to the latter cd2, the second decode order comparator 39 asserts the second write signal w2. The functions of the following third and fourth decode order constant memory units 40 and 42 and the following third and fourth decode order comparators 41 and 43 are similar to those of the first and second decode order constant memory units 36 and 38 and the first and second decode order switches 37 and 39 respectively.

The principle of operation of the third embodiment with a configuration described above is explained as follows.

Also in this embodiment, a bar-code reader, not shown in the figure, reads a bar code, creating a binary signal having binary values to represent the black and white levels of the bar code. The binary signal is supplied to a timer circuit, also not shown in the figure, to be added to bar-code data bc and converted into a count value which numerically represents the widths of bars of the bar code. The bar-code data bc is supplied directly to the bar-code decoders 11 to 14 of the decoder unit 1 through the bar-code data input line 4. The operations up to this point are the same as those of the first embodiment.

This embodiment is characterized in that the decoding operations of the bar-code decoders 11 to 14 employed in the decoder unit 1 are arranged into an order in which one of the bar-code decoders 11 to 14 successful in the previous decoding operation is to be selected first. The following description explains how such an order is set by the decode order setter 24. The operations of the circuits such as the decoder unit 1, the counter 2 and the OR gate 3 following the operation to set the order by the decode order setter 24 are also the same as those of the first embodiment and, therefore, not described here.

The following description explains how the decode order setter 24 sets the order of decoding operations to be carried out by the bar-code decoders 11 to 14 of the decoder unit 1. Assume, in this case, that one of the bar-code decoders 11 to 14 employed in the decoder unit 1, e.g. the bar-code decoder 12 for the C39 system, decodes bar-code data bc successfully. Also assume that data stored in the first, second, third and fourth decode order memory units 26, 28, 30 and 32, that is, the first, second, third and fourth order signals od1 to od4, have been set so that the bar-code decoders 11 to 14 are selected for a decoding operation in an order of ascending reference numerals starting with reference numeral 11 and ending with reference numeral 14.

Now that the bar-code decoder 12 for the C39 system has decoded the bar-code data bc successfully, decoded data dd is output through the decoded data output line 5. At the same time, a decode success signal or an OK signal is asserted on the decode success signal output line 6. The OK signal is fed to the decode order switch signal generator 25 of the decode order setter 24 through the decode success signal output line 6. When the OK signal is received by the decode order switch signal generator 25, the first and second decode order comparators 37 and 39 output the first and second write signals w1 and w2 respectively. On the other hand, the third and fourth decode order comparators 41 and 43 do not assert their output signals. Accordingly, only the AND gate 48 satisfies its logical-product condition. As a result, only the second set signal s2, the output of the AND gate 48, becomes active. The second write signal w2 and the second set signal s2 are then supplied to the second decode order memory unit 28 and the second decode order switch 29. As described earlier, the write signal w2 causes the second decode order memory unit 28 to store the second preset signal Pr2, the first order signal od1 forwarded by the first decode order switch 27 from the first decode order memory unit 26. The second preset signal Pt2, or the first order signal od1, is then output by the second decode order memory unit 28 as a new second order signal od2. Also as described earlier, the simultaneous assertion of the second write signal w2 and the second set signal s2 causes the second decode order switch 29 to forward the old second order signal od2, which has been output so far, to the first decode order memory unit 26 as the first preset signal Pr1. The first preset signal Pr1 is then stored in the first decode order memory unit 26 and output as a new order signal od1. In this way, the contents of the first and second decode order memory units 26 and 28 are exchanged with each other. Accordingly, the new first order signal od1 next time will select the bar-code decoder 12 for the C39 to operate first and to be followed by the bar-code decoder 11 for the JAN system which is selected by the new second order signal od2.

A case study has been given above for this embodiment. In this case, one of the bar-code decoders 11 to 14 employed in the decoder unit 1, i.e. the bar-code decoder 12 for the C39 system, decodes bar-code data bc successfully. It should be noted, however, that the description given above applies not only to the bar-code decoder 12 for the C39 system, but also to the other bar-code decoders 11, 13 and 14 as well. That is to say, also in the case of the bar-code decoder 11 for the JAN system, the bar-code decoder 13 for the NW7 system or the bar-code decoder 14 for the ITF system, an operation exactly identical with that for the bar-code decoder 12 for the C39 system is performed whenever the bar-code data bc is decoded successfully.

Generally speaking, when bar-code data of a certain system is supplied, it is very likely that the succeeding bar-code data of the same type as the preceding one follows. As a matter of fact, the embodiment is configured with this phenomenon taken into consideration.

To be more specific, in the case of this embodiment, when a bar-code decoder decodes bar-code data bc successfully, the very same bar-code decoder is selected again for decoding the following bar-code data bc. In this way, not only does the adopted decoding technique save the automatically identifying decode apparatus the time required for storing bar-code data into a count-value memory unit, but the time from an operation to start reading bar-code data to the completion of an operation to decode it can thus further be shortened considerably. In addition to the benefit reaped from the fact that a smaller amount of required RAM is sufficient due to the elimination of the no-longer-used count-value memory unit from the automatically identifying decode apparatus, an effect of reliability enhancement of decoded data is also resulted in as well.

Figure 7:
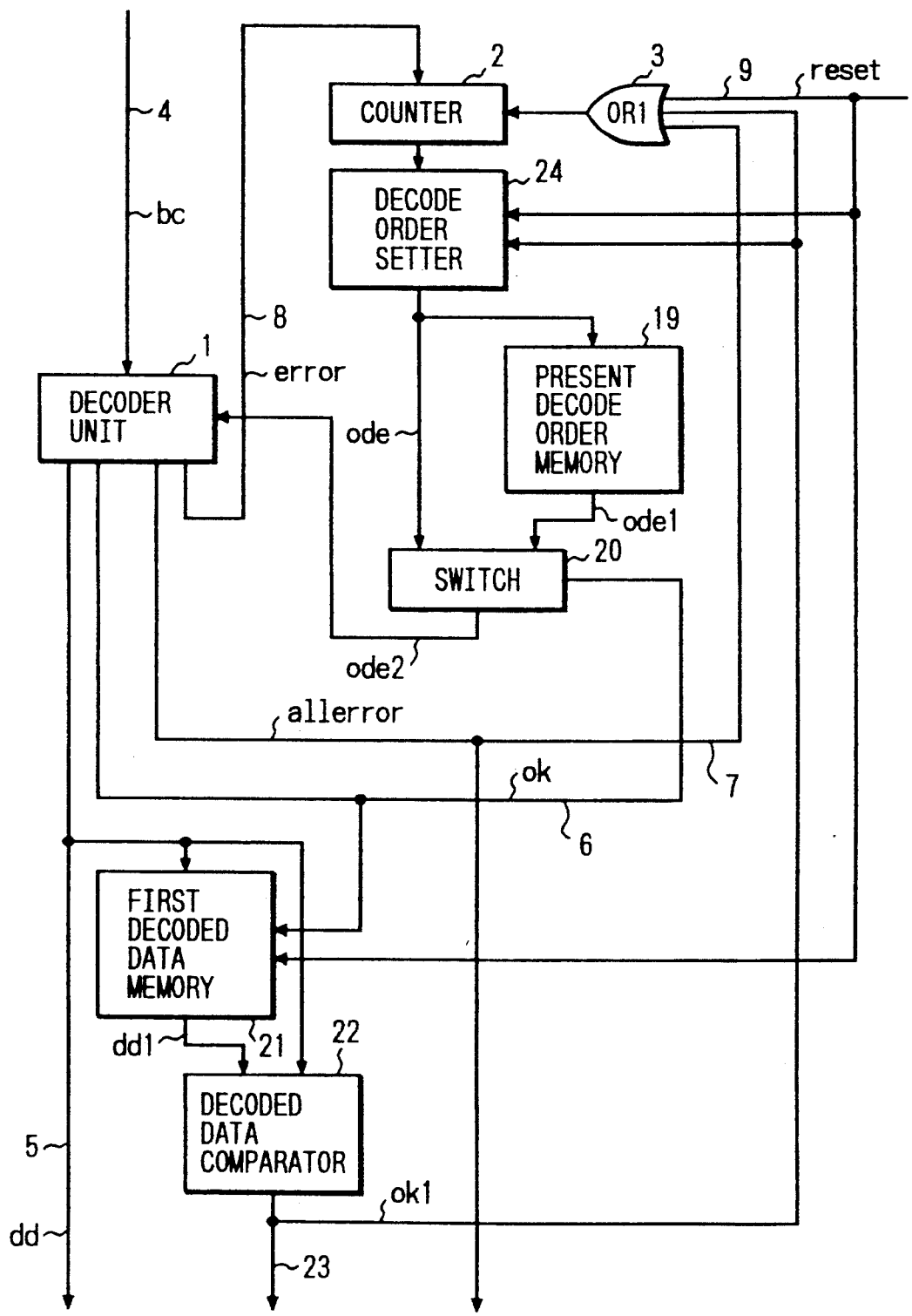
FIG. 7 is a circuit block diagram showing a configuration of a fourth embodiment implementing an automatically identifying decode apparatus in accordance with the present invention.
Figure 8:
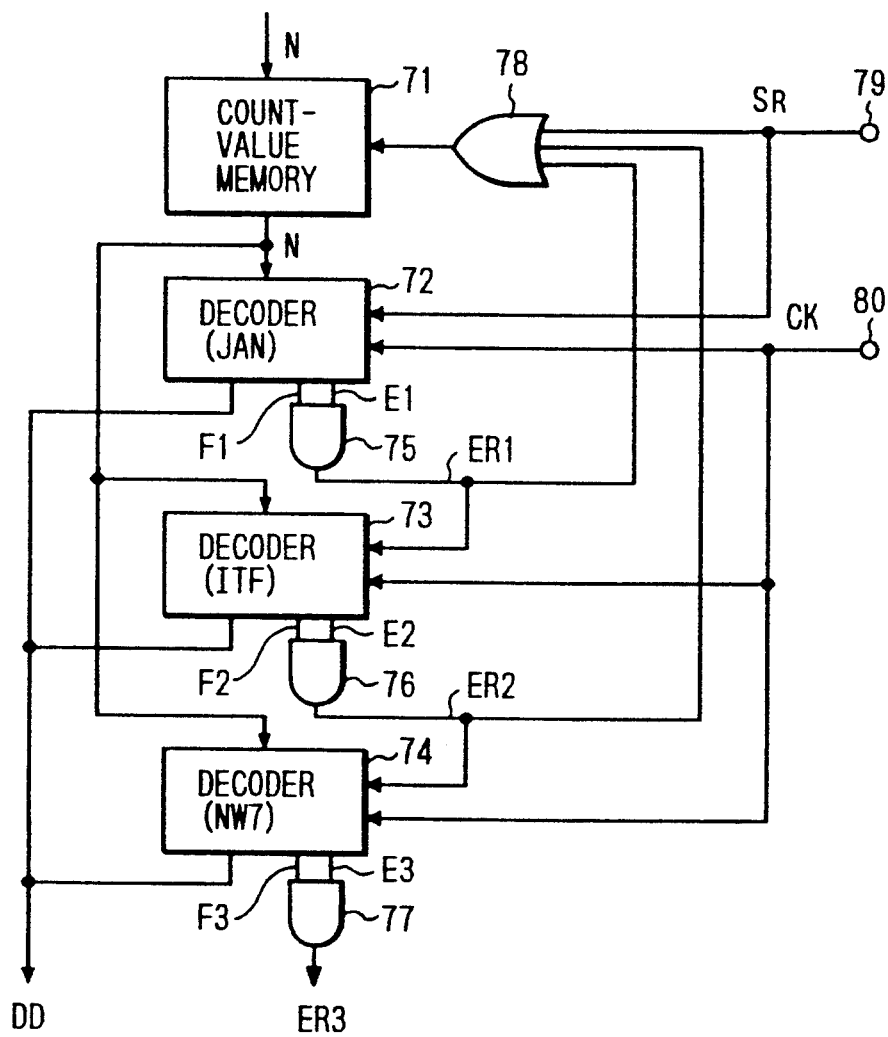
FIG. 8 is a circuit block diagram showing a configuration of a typical conventional automatically identifying decode apparatus.

It should be noted that by incorporating the decode order setter 24 on the output side of the counter 2 in the second embodiment described earlier as shown in FIG. 7, the combined merits of the second and third embodiments can be materialized.

What is claimed is:

1. An automatically identifying decode apparatus a decoder unit and a counter, wherein:
    said decoder unit further comprises a plurality of decoders each for decoding digital data of a certain type among a plurality of different digital-data types and a decoder selector for sequentially selecting one of said decoders;
    said counter is used for sequentially advancing a process of selecting said decoders of said decoder unit;
    bar code data is supplied directly to said decoders of said decoder unit;
    one of said decoders successfully decoding said digital data outputs decoded data; and
    a selected decoder failing to decode said digital data transmits an error signal to said counter, requesting said counter to advance said process of selecting said decoders by one decoder; wherein said apparatus further comprises:
    a decode selection order switching means between said decoder unit and said counter for selecting either a value presently output by said counter or a value output by said counter in a previous successful decoding operation; and
    a decoded-data comparing means on the output side of said decoder unit for comparing decoded data presently output by said decoder unit to decoded data output by said decoder unit in a previous successful decoding operation.

2. An automatically identifying decode apparatus comprising a decoder unit and a counter, wherein:
    said decoder unit further comprises a plurality of decoders each for decoding digital data of a certain type among a plurality of different digital-data types and a decoder selector for sequentially selecting one of said decoders;

said counter is used for sequentially advancing a process of selecting said decoders of said decoder unit;

bar code data is supplied directly to said decoders of said decoder unit;

one of said decoders successfully decoding said digital data outputs decoded data; and a selected decoder failing to decode said digital data transmits an error signal to said counter, requesting said counter to advance said process of selecting said decoders by one decoder;

wherein said apparatus further comprises:

a decode order setting means between said decoder unit and said counter for changing a decoder selecting order according to which said decoders of said decoder unit are to be sequentially selected;

a decode selection order switching means between said decoder unit and said counter for selecting either a value presently output by said counter or a value output by said counter in a previous successful decoding operation; and a decoded-data comparing means on the output side of said decoder unit for comparing decoded data presently output by said decoder unit to decoded data output by said decoder unit in a previous successful decoding operation.

* * * * *